United States Patent
Wright

(10) Patent No.: US 9,732,719 B2
(45) Date of Patent: Aug. 15, 2017

(54) COLD TEMPERATURE ENGINE START STRATEGIES

(71) Applicant: FORD GLOBAL TECHNOLOGIES, LLC, Dearborn, MI (US)

(72) Inventor: Robert Wright, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 142 days.

(21) Appl. No.: 14/530,131

(22) Filed: Oct. 31, 2014

(65) Prior Publication Data
US 2016/0123292 A1    May 5, 2016

(51) Int. Cl.
| | | |
|---|---|---|
| *F02N 11/04* | (2006.01) | |
| *B60W 30/192* | (2012.01) | |
| *F02N 11/08* | (2006.01) | |
| *B60K 6/383* | (2007.10) | |
| *B60K 6/547* | (2007.10) | |
| *B60K 28/04* | (2006.01) | |
| *B60K 28/12* | (2006.01) | |
| *B60W 10/02* | (2006.01) | |
| *B60W 10/06* | (2006.01) | |
| *B60W 10/08* | (2006.01) | |
| *B60W 10/26* | (2006.01) | |
| *B60W 10/30* | (2006.01) | |
| *B60W 20/00* | (2016.01) | |
| *B60W 30/18* | (2012.01) | |
| *B60W 30/194* | (2012.01) | |
| *F02N 11/00* | (2006.01) | |

(Continued)

(52) U.S. Cl.
CPC .......... *F02N 11/0855* (2013.01); *B60K 6/383* (2013.01); *B60K 6/547* (2013.01); *B60K 28/04* (2013.01); *B60K 28/12* (2013.01); *B60W 10/02* (2013.01); *B60W 10/06* (2013.01); *B60W 10/08* (2013.01); *B60W 10/26* (2013.01); *B60W 10/30* (2013.01); *B60W 20/00* (2013.01); *B60W 30/18054* (2013.01); *B60W 30/194* (2013.01); *B60K 2006/4825* (2013.01); *B60W 2710/022* (2013.01); *B60W 2710/023* (2013.01); *F02N 11/006* (2013.01); *F02N 11/0833* (2013.01); *F02N 15/022* (2013.01); *F02N 2200/0815* (2013.01); *Y02T 10/6252* (2013.01); *Y02T 10/6286* (2013.01)

(58) Field of Classification Search
CPC ................ B60W 30/192; F02D 41/064; F02N 2200/106
See application file for complete search history.

(56) References Cited

U.S. PATENT DOCUMENTS

| | | | |
|---|---|---|---|
| 4,819,493 A | 4/1989 | Dornan | |
| 6,852,062 B1 * | 2/2005 | Ahner | ...................... B60K 5/08 180/65.25 |

(Continued)

*Primary Examiner* — Tisha Lewis
(74) *Attorney, Agent, or Firm* — David B. Kelley; Brooks Kushman P.C.

(57) ABSTRACT

A method of starting a vehicle may include, in response to an expected driver entry, stroking a clutch configured to couple an engine to an electric machine for a predetermined time period. The method may further include, in response to an engine start request received during the predetermined time period, providing power to the electric machine to spin the electric machine at a speed at least equal to a target engine cranking speed.

18 Claims, 3 Drawing Sheets

(51) Int. Cl.
*F02N 15/02* (2006.01)
*B60K 6/48* (2007.10)

(56) References Cited

U.S. PATENT DOCUMENTS

| | | | |
|---|---|---|---|
| 7,066,126 B2 * | 6/2006 | Tokuyasu | F02D 41/064 |
| | | | 123/179.17 |
| 8,192,324 B2 * | 6/2012 | Kraska | B60K 6/48 |
| | | | 477/5 |
| 2002/0149262 A1 | 10/2002 | Weyerstall et al. | |
| 2004/0206337 A1 | 10/2004 | Tokuyasu et al. | |
| 2009/0271070 A1 * | 10/2009 | Feller | B62D 5/008 |
| | | | 701/41 |
| 2011/0275478 A1 * | 11/2011 | Cuppers | B60W 10/06 |
| | | | 477/99 |

* cited by examiner

COLD TEMPERATURE ENGINE START STRATEGIES

TECHNICAL FIELD

This patent application relates to systems and methods of engine starting at cold temperatures.

BACKGROUND

Hybrid electric vehicles (HEV) may be provided with an internal combustion engine and an electric machine in communication with a high voltage battery. Either or both the internal combustion engine and the electric machine are capable of generating power and torque to propel the HEV. The electric machine may be used to provide torque to crank the engine to start the engine in some scenarios. Some HEV's may be provided with a low voltage starter to assist the electric machine in starting the engine at low temperatures.

SUMMARY

A vehicle includes a friction element configured to selectively mechanically couple an engine and an electric machine and a controller. In response to a signal indicative of an unlocked or open door, the controller commands that the friction element couple the engine to the electric machine prior to receiving an engine start request.

A controller for a vehicle includes input communication channels configured to receive a temperature, a driver presence status, and an engine start request. The controller further includes output communication channels configured to provide a clutch command. In response to the driver presence status indicating the presence of a driver proximate the vehicle and the temperature being less than a threshold, the controller commands the clutch to operatively couple an engine to an electric machine prior to receiving the engine start request.

A method of starting a vehicle includes, in response to an expected driver entry, stroking a clutch configured to couple an engine to an electric machine for a predetermined time period. In response to an engine start request received during the predetermined time period, the method further includes providing power to the electric machine to spin the electric machine at a speed at least equal to a target engine cranking speed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
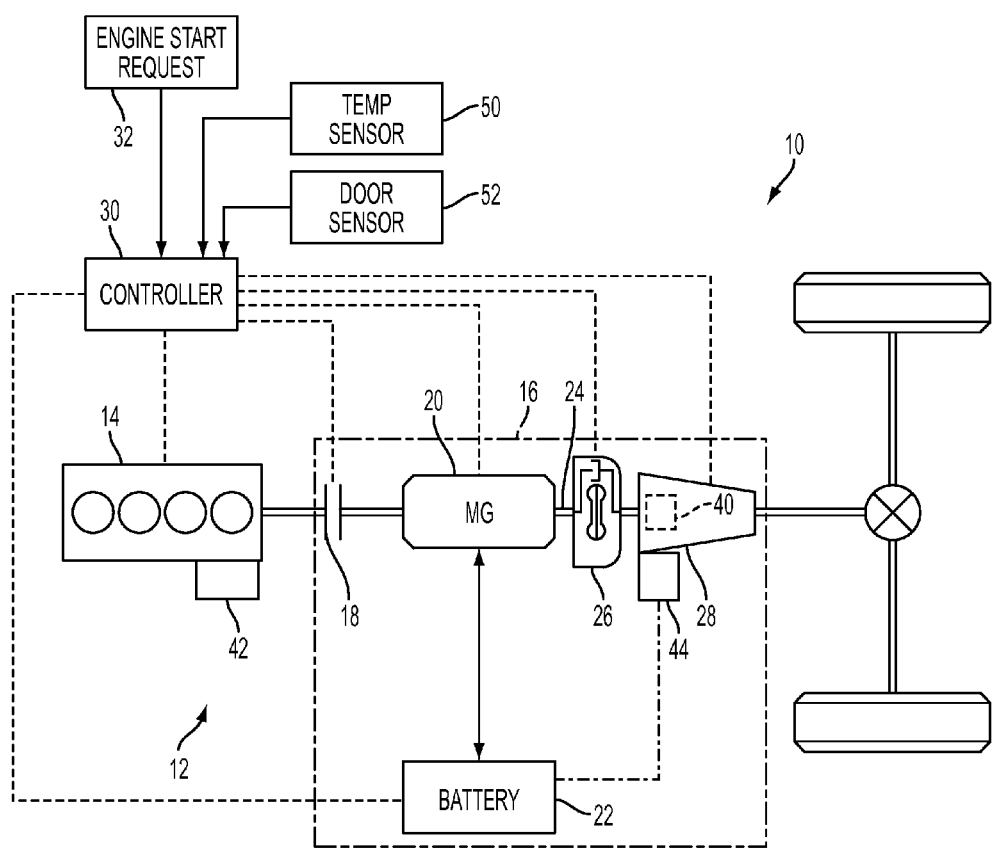
FIG. 1 is a schematic diagram of a vehicle.

Referring to FIG. 1, a schematic diagram of a vehicle 10 is illustrated according to an embodiment of the present disclosure. Physical placement and orientation of the components within the vehicle 10 may vary. Although the vehicle of FIG. 1 will be particularly described, the strategies in accordance with embodiments of the present disclosure may apply to other vehicle configurations.

The vehicle 10 may include a powertrain 12 having an engine 14 that is operatively connected to a transmission 16. The transmission 16 may include a disconnect clutch 18, an electric machine 20 such as an electric motor-generator, an associated traction battery 22, an input shaft 24, a launch clutch or torque converter 26, and a gear box 28.

The torque converter 26 may be positioned between the electric machine 20 and the transmission gear box 28. The torque converter 26 may provide torque multiplication during launch events. The torque converter 26 may also perform torsional isolation to the driveline such that the driveline is isolated from disturbances.

The engine 14 may be selectively mechanically coupled to the electric machine 20 by the disconnect clutch 18. The engine 14 and the electric machine 20 may both act as drive sources for the vehicle 10 by providing torque to the gearbox 28 via a transmission input shaft 24. The electric machine 20 may be implemented by any one of a plurality of types of electric machines, such as a permanent magnet synchronous motor.

The transmission 16 may be configured as a step-ratio transmission using multiple friction elements for transmission gear ratio changes. The transmission 16 may be configured to produce multiple forward and reverse gears via multiple gearing elements within the gear box 28.

A controller 30 may be configured to operate the vehicle 10 or powertrain 12 in a plurality of modes. The controller may operate the vehicle 10 in a charge depletion mode in which the engine 14 may be isolated from the remainder of the powertrain 12, via the disconnect clutch 18. In the charge depletion mode, the electric machine 20 may act as the sole drive source for the vehicle 10 using the traction battery 22 as its power source. The controller 30 may operate the vehicle 10 in a charge sustaining mode in which the engine 14 is operatively connected to the remainder of the powertrain 12, via the disconnect clutch 18. In the charge sustaining mode, the engine 14 and electric machine 20 may act as drive sources for the vehicle 10.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions such as starting/stopping the engine 14, operating electric machine 20 to provide wheel torque or charge the traction battery 22, selecting or scheduling transmission shifts, etc.

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the powertrain 12 or vehicle 10.

The controller 30 may be in communication with the powertrain 12, a plurality of vehicle sensors, and a device configured to provide an engine start request 32. The engine start request 32 may be provided by an operator input such as an ignition switch, push button, key fob, remote engine starter, or the like.

In response to receiving the engine start request 32, the controller 30 may control the disconnect clutch 18 to couple the engine 14 with the electric machine 20. The electric machine 20 torque produced by the spinning of the electric machine 20 may be transferred to the engine 14 to turn or crank the engine 14.

The disconnect clutch 18 may be provided with clutch elements such as clutch plates, friction elements, or pistons. The clutch elements may be "stroked" from a disengaged or "unstroked" state to an engaged state to couple the engine 14 with the electric machine 20. The clutch elements may engage each other by receiving hydraulic pressure supplied by a transmission pump 40 operatively coupled to the electric machine 20.

The electric machine 20 may receive power from the traction battery 22 to spin the electric machine 20. As increased power is provided to the electric machine 20, the electric machine speed may increase and subsequently increase the transmission pump speed. The transmission pump 40 may provide additional hydraulic pressure to the disconnect clutch 18 to increase the torque carrying capacity of the disconnect clutch 18.

The electric machine 20 may rotate the engine 14 up to a target engine cranking speed. Upon the engine 14 achieving the target engine cranking speed, the engine 14 may be fueled and fired to accelerate to a synchronous speed.

The synchronous speed may be the operating point at which both sides of the disconnect clutch 18 are rotating at the same speed. At this operating point, the engine 14 and the electric machine 20 may be rotating at the same speed when the disconnect clutch is locked. This may represent a no slip condition between the engine 14 and the electric machine 20.

The above described engine starting process may require the traction battery 22 to provide a large amount of power to the electric machine 20. For example, for the electric machine 20 to continuously apply 100 N-m to the engine 14 to reach the target engine cranking speed, the controller 30 may request that the traction battery 22 provide at least 15 kW of power to the electric machine 20 during the starting process.

Engine starts at low temperatures may present challenges due to restricted traction battery power at low temperatures. For example, at ambient temperatures less than −10 C, the traction battery 22 may be able to provide less than 10 kW to the electric machine 20 to start the engine 14. Therefore, in some vehicle application, a low voltage starter 34 may be used to start the engine 14 at low temperatures.

Even if some power is provided to the electric machine 20 at low temperatures, the overall time required to start the engine 14 may be increased due to an increase in the viscosity of powertrain fluids. Such powertrain fluids may be transmission fluid, engine oil, hydraulic oil, brake fluids, etc. For example, at low temperatures, the increased viscosity of the transmission fluid may increase the amount of time required to prime the transmission pump to provide hydraulic pressure to stroke the disconnect clutch 18.

The low voltage starter 42 may assist the electric machine 20 to start the engine 14 in low temperature conditions. The low voltage starter 42 may begin to rotate the engine 14 while the transmission pump 40 is being primed. Upon the transmission pump 40 being primed, hydraulic pressure may be provided to the disconnect clutch 18 and the electric machine 20 may be coupled to the engine 14 and the starting process completed. This scheme may require additional components including a low voltage battery and wiring sized for the cold cranking current provided by the low voltage battery.

In an effort to avoid the additional cost and weight associated with implementing the low voltage starter 42 and to reduce the total engine start time at low temperatures, the controller 30 may be provided with a cold temperature engine start strategy. The cold start strategy may request that the disconnect clutch 18 be stroked prior to the controller 30 receiving the engine start request 32 when a cold start condition is detected and a driver entry into the vehicle 10 is predicted.

The controller 30 may include input communication channels configured to receive a signal indicative of a temperature from a temperature sensor 50. The controller 30 may compare the temperature to a threshold temperature. The threshold temperature may be a temperature below which the engine start process may take longer than a calibrated engine start time. The controller 30 may be provided with a look-up table or other correlations between expected engine start times and temperature determined by characterization tests.

The temperature sensor 50 may be a sensor configured to monitor an ambient temperature, a coolant temperature, an engine oil temperature, a vehicle cabin temperature, a transmission oil temperature, a traction battery temperature, or other temperature associated with the vehicle.

The controller 30 may predict the driver entry into the vehicle 10 in a variety of ways. The controller 30 may include input communication channels configured to receive a signal indicative of a driver presence from a smart key, key fob, or other such device. The vehicle 10 may be provided with a passive entry system that may permit the controller 30 to predict a driver intention to enter the vehicle 10 based on the driver presence within a predetermined range of the vehicle 10.

The controller 30 may include input communication channels configured to receive a signal indicative of a door status from a door sensor 52. The door status may indicate that a driver intends to enter the vehicle 10 by providing a signal indicative of an unlocked or open vehicle door. The door status may indicate if a vehicle door is open, closed, locked, or unlocked. The door sensor 52 may be a door jamb switch, a sensor configured to receive a door unlock/lock signal from a key fob, a sensor configured to provide the unlocked/locked state of a vehicle door lock, or the like.

The controller 30 may include output communication channels configured to provide a clutch command to the disconnect clutch 18. The clutch command may be provided in response to a signal indicative of a temperature less than a threshold and a signal indicative of an unlocked or open vehicle door prior to receiving an engine start request.

The clutch command may command that the disconnect clutch 18 couple or de-couple the engine 14 with the electric machine 20. The disconnect clutch 18 may be prepared prior to stroking by dithering. Dithering of the disconnect clutch 18 may cycle the clutch elements or friction elements such that the elements are lubricated and prepared for stroking.

The clutch elements or friction elements of the disconnect clutch 18 may then be stroked. The stroking of the disconnect clutch 18 may result in the clutch elements or friction elements engaging with a reduced or minimal torque carrying capacity. The stroking may operatively couple the engine 14 with the electric machine 20. The clutch command may further command that hydraulic pressure be provided by the transmission pump 40 or an auxiliary electric pump 44 to the disconnect clutch.

The minimal torque carrying capacity may result in a slip condition between the clutch elements. The reduced torque carrying capacity of the disconnect clutch 18 may inhibit the electric machine 20 from transmitting torque to the engine 14 through the disconnect clutch 18.

The clutch elements coming into contact with minimal or reduced torque carrying capacity may be referred to as the "touch point". The clutch elements may be held at the "touch point" for a predetermined time period in which the controller 30 may wait to receive an engine start request 32.

The clutch elements may be maintained at the "touch point" for a calibrateable time. The calibrateable time period may depend on many factors including the state of charge of the traction battery 22 or the ambient temperature. If an engine start request 32 is received during the predetermined time period, the torque carrying capacity of the disconnect clutch 18 may be increased ("capacitized") such that a no-slip condition occurs between the clutch elements.

In satisfying the clutch command, a minimum amount of hydraulic pressure may be provided to the clutch elements of the disconnect clutch 18 by at least one of the transmission pump 40 or auxiliary electric pump 44. The hydraulic pressure may maintain the clutch elements or friction elements of the disconnect clutch 18 at the touch point.

The traction battery 22 or a low voltage battery may be commanded to provide power to the auxiliary electric pump 44 to supply hydraulic pressure to the transmission 16. For example, the hydraulic pressure generated may be sufficient to maintain the transmission 16 in a gear while the vehicle 10 is at a stop light. The auxiliary electric pump 44 may be unable to provide hydraulic pressure to change transmission gears or to start the engine 14.

In at least one embodiment, the traction battery 22 may be commanded to provide power to the electric machine 20 to operate the transmission pump 40 to provide transmission hydraulic pressure to the transmission 16. The transmission pump 40 may have a much larger capacity than the auxiliary electric pump 44. The electric machine 20 may require that a large amount of power be provided to spin the electric machine 20 to operate the transmission pump 40 to provide hydraulic pressure to the transmission 16 and ultimately the disconnect clutch 18.

In response to the engine start request 32 received during the predetermined time period, the controller 30 may determine or calculate a target engine cranking speed at which an engine start may be achieved. The target engine cranking speed may be a target speed determined from characterization tests at various ambient temperatures. These target values may be provided as part of a look-up table.

The controller 30 may command that the traction battery provide power to the electric machine 20 to spin the electric machine 20 at a speed at least equal to a target engine cranking speed. The amount of traction battery power provided may be based on the ambient temperature or temperature associated with the vehicle. As the amount of traction battery power provided to the electric machine 20 increases, the speed of the electric machine 20 may increase.

As the motor generator speed increases, the transmission pump 40 may increase the hydraulic pressure provided to the disconnect clutch 18. The increased hydraulic pressure may increase the torque carrying capacity of the disconnect clutch 18. The increase in the torque carrying capacity of the disconnect clutch 18 may increase the transfer of the rotational inertia of the electric machine 20 to the engine 14 to increase the rotational speed of the engine 14. The controller 30 may then command an engine start by requesting that fuel be provided to the engine 14 to initiate combustion.

If an engine start request 32 is not received during the predetermined time period or prior to the expiry of the predetermined time period, the controller 30 may command that the disconnect clutch 18 be de-stroked. The controller 30 may command that hydraulic pressure be no longer provided to the disconnect clutch 18. The cessation of hydraulic pressure may operatively decouple the engine 14 from the electric machine 20.

Figure 2A:
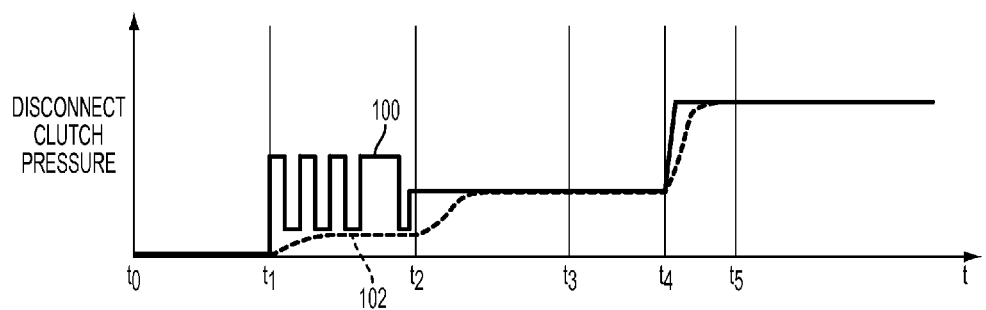
FIGS. 2A-2C are corresponding time plots showing an exemplary system response.
Figure 2B:
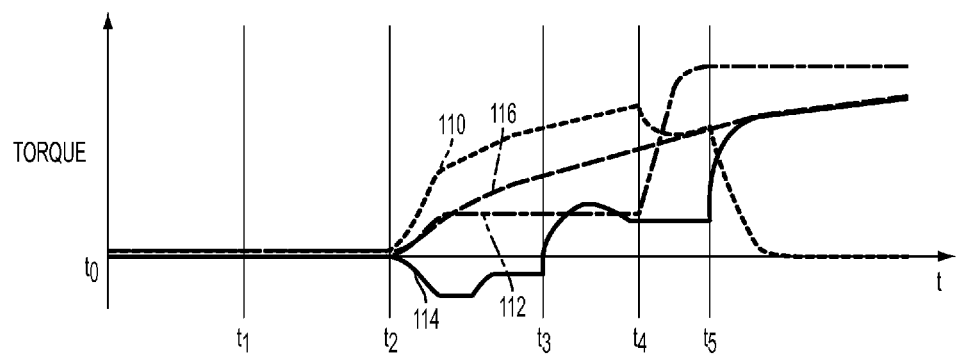
Figure 2C:
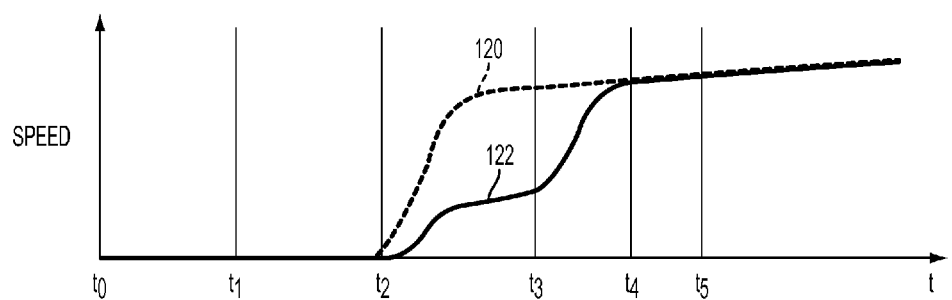

FIGS. 2A through 2C depict corresponding time plots of disconnect clutch pressure, powertrain component torques, and powertrain component speeds, respectively. The plots may correspond in time and demonstrate an exemplary embodiment of a cold temperature engine start strategy.

FIG. 2A is a plot of the disconnect clutch pressure, specifically, the disconnect clutch commanded pressure 100 and the measured disconnect clutch pressure 102. At time t0, the vehicle 10 may be at rest and in a cold environment. Proximate time t1, in response to the enablement basics, including a temperature less than a threshold and an expected driver entry into the vehicle 10, the controller 30 may command that the disconnect clutch 18 be dithered and stroked by commanding that hydraulic pressure be provided to the disconnect clutch 18.

Hydraulic pressure may be provided to the disconnect clutch 18 by the transmission pump 40 or the auxiliary electric pump 44 such that the clutch elements of the disconnect clutch 18 may cycle, engage, and be held at the "touch point." The hydraulic pressure may continue to be provided to the disconnect clutch 18 as the controller 30 waits for an engine start request 32.

Proximate time t2 an engine start request 32 may be received by or commanded by the controller 30. Additional hydraulic pressure may be commanded to be provided to the disconnect clutch 18 to increase the torque carrying capacity of the disconnect clutch 18 to facilitate the starting of the engine 14 using the electric machine 20.

FIG. 2B is a plot of powertrain component torques, specifically, the motor generator torque 110, the disconnect clutch torque carrying capacity 112, the engine torque 114, and a driver demanded torque 116. After receiving the engine start request 32 proximate time t2, the controller 30 may command that traction battery power be provided to the electric machine 20 to spin the electric machine 20 up to a target motor generator speed and increase the motor generator torque 110. As the motor generator torque 110 begins to increase, the disconnect clutch torque carrying capacity 112 may begin to increase as the disconnect clutch pressure 102 increases. The increasing disconnect clutch torque carrying capacity 112 may lead to a further increase in the rotational speed of the engine 14. The spinning of the engine 14 by the electric machine 20 may result in a negative engine torque 114.

FIG. 2C is a plot of power train component speeds, specifically, the motor generator speed 120 and the engine speed 122. Proximate time t2, after the engine start request 32 has been received by the controller 30, the motor generator speed 120 may begin to increase. As shown in FIG. 2B, the disconnect clutch torque carrying capacity 112 may increase to further couple the engine 14 with the electric machine 20 which may lead to an increase in the engine speed 122.

Upon the engine speed 122 achieving the target engine cranking speed, proximate time t3, the engine 14 may be fueled and fired. Referring to FIG. 2B, upon the engine 14 producing torque, the engine torque 114 may become positive proximate time t3.

Referring to FIG. 2C, the controller 30 may command that the engine speed 122 increase at least up to the motor generator speed 120. Proximate time t4, the electric machine 20 and the engine 14 may be rotating at the same speed or the synchronous speed.

Referring to FIGS. 2A and 2B, the controller 30 may command that the disconnect clutch 18 begin locking proximate time t4. The disconnect clutch commanded pressure 100 may increase and the measured disconnect clutch pressure 102 may increase, thus increasing the disconnect clutch torque carrying capacity 112 such that a no-slip condition occurs between the clutch elements or friction elements of the disconnect clutch 18. The torque carrying capacity of the clutch elements or friction elements of the disconnect clutch 18 increases such that the engine 14 and electric machine 20 may be spun at a synchronous speed to facilitate an engine start. Upon the disconnect clutch 18 locking, the controller 30 may command that the engine torque 114 increase to satisfy the driver demanded torque 116 proximate time t5.

Figure 3:
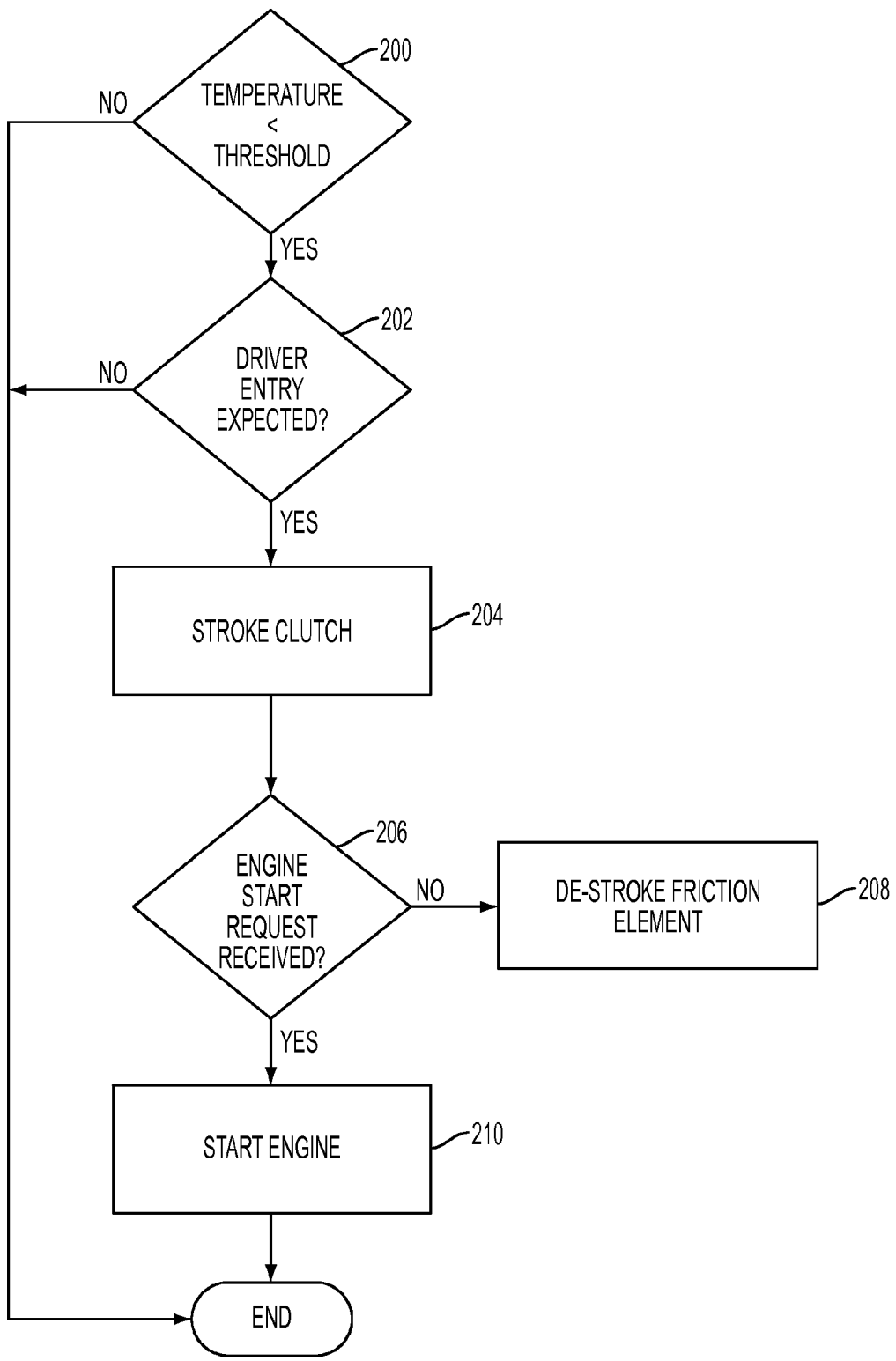
FIG. 3 is a flow chart of an algorithm for starting a vehicle.

Referring to FIG. 3, a flowchart of an exemplary method of starting the vehicle 10 is shown. The method may be executed by the controller 30 and may be implemented as a closed loop control system. For brevity, the method will be described in the context of a single method iteration below.

The control logic may monitor and receive a signal indicative of temperature from the temperature sensor 50, a signal indicative of a door status from the door sensor 52, and an engine start request 32. At block 200, the method may compare the temperature to a threshold temperature. If the temperature is greater than the threshold temperature, the method may end. Should the temperature be less than the threshold temperature, the method may continue to block 202.

At block 202, the method may determine if a driver entry is expected. The driver entry may be expected if the door status signal indicates that a vehicle door is unlocked or open. The driver entry may be expected if a vehicle interior light status signal indicates that a vehicle interior light is on or activated. The driver entry may be expected if the vehicle passive entry system status signal indicates that a driver is proximate the vehicle. If any of the above mentioned signals or other ways do not predict or expect driver entry, the method may end. Should driver entry be expected, the method may continue to block 204.

At block 204, the method may command that a clutch element or friction element of the disconnect clutch 18 be dithered or cycled and stroked. Hydraulic pressure may be provided to the disconnect clutch 18 to dither and stroke the clutch elements such that the clutch elements ultimately engage with minimal torque carrying capacity. This engagement may couple the engine 14 with the electric machine 20 for a predetermined time.

At block 206, the method may determine if an engine start request 32 has been received within the predetermined time. If an engine start request 32 was not received prior to the expiry of the predetermined time, the method may command that the disconnect clutch 18 be de-stroked at block 208. Hydraulic pressure may be commanded to no longer be provided to the disconnect clutch, de-stroking the clutch elements or friction elements of the disconnect clutch 18 such that the engine 14 is decoupled from the electric machine 20.

Should an engine start request be received within the predetermined time, the method may continue to block 210. At block 210, the method may command an engine start. The disconnect clutch 18 may be capacitized by receiving additional hydraulic pressure to increase the torque carrying capacity of the disconnect clutch 18. The electric machine 20 may begin spinning and in turn begin spinning the engine 14 to continue the engine starting process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a friction element configured to selectively mechanically couple an engine and an electric machine to establish a path through the friction element for torque from the engine to drive wheels; and
   a controller programmed to,
      in response to a signal indicative of an unlocked or open door, command the friction element to couple the engine to the electric machine prior to receiving an engine start request, and
      in response to an engine start request, command that battery power be provided to the electric machine to spin the electric machine while increasing a torque carrying capacity of the friction element.

2. The vehicle of claim 1, wherein a pressure is applied to the friction element to hold the friction element at a touch point to couple the engine to the electric machine.

3. The vehicle of claim 1, wherein the controller is further programmed to, in response to not receiving an engine start request within a predetermined time period after the signal indicative of an unlocked or open door, command the friction element to de-couple the engine from the electric machine.

4. The vehicle of claim 1, wherein a friction element torque carrying capacity increases such that the engine and the electric machine are spun at a synchronous speed.

5. The vehicle of claim 2, wherein the pressure is provided to the friction element by an auxiliary electric pump.

6. The vehicle of claim 2, wherein the pressure is provided to the friction element by a transmission pump coupled to the electric machine.

7. A controller for a vehicle comprising:
   input communication channels configured to receive a temperature, a driver presence status, and an engine start request;
   output communication channels configured to provide a clutch command; and
   control logic configured to,
      in response to the driver presence status indicating a presence of a driver proximate the vehicle and the temperature being less than a threshold, command a clutch to operatively couple an engine to an electric machine prior to receiving the engine start request to establish a path through the clutch for torque from the engine to drive wheels, and in response to not receiving an engine start request after coupling the engine to the electric machine, command the clutch to de-couple the engine from the electric machine.

8. The controller of claim 7, wherein the control logic is further configured to in response to the engine start request, command that battery power be provided to the electric machine to spin the electric machine and the engine to a target speed.

9. The controller of claim 7, wherein the clutch operatively couples the engine to the electric machine such that a slip condition occurs between elements of the clutch.

10. The controller of claim 7, wherein the clutch operatively couples the engine to the electric machine such that a no-slip condition occurs between elements of the clutch as the electric machine and the engine approach a target speed.

11. The controller of claim 9, wherein commanding the clutch includes commanding an auxiliary pump to provide hydraulic pressure to the clutch to couple the engine to the electric machine.

12. The controller of claim 9, wherein commanding the clutch includes commanding a transmission pump operatively coupled to the electric machine to provide hydraulic pressure to the clutch to couple the engine to the electric machine.

13. A method of starting a vehicle comprising:

in response to an expected driver entry, stroking a clutch configured to couple an engine to an electric machine for a predetermined time period; and in response to an engine start request received during the predetermined time period, providing power to the electric machine to spin the electric machine at a speed at least equal to a target engine cranking speed.

14. The method of claim 13 wherein stroking the clutch comprises providing hydraulic pressure to the clutch such that elements of the clutch come into contact with a reduced torque carrying capacity.

15. The method of claim 13 further comprising, in response to expiry of the predetermined time period without receiving an engine start request, de-stroking the clutch.

16. The method of claim 13 wherein the expected driver entry is defined by a door status signal, a vehicle interior light status, or a driver presence proximate a vehicle.

17. The method of claim 14 further comprising, in response to the engine start request, providing hydraulic pressure to the clutch such that the engine and the electric machine are spun at a synchronous speed.

18. The method of claim 14 wherein the hydraulic pressure is provided to the clutch by providing power to the electric machine to spin a transmission pump based on an ambient temperature.

* * * * *